US012722898B2

(12) United States Patent
Anders et al.

(10) Patent No.: US 12,722,898 B2
(45) Date of Patent: Sep. 1, 2026

(54) ARRANGEMENT WITH CONVEYOR AND SCALE

(71) Applicant: Wipotec GmbH, Kaiserslautern (DE)

(72) Inventors: Daniel Anders, Osthofen (DE); Markus Jochen Walter, Trippstadt (DE)

(73) Assignee: Wipotec GmbH, Kaiserslautern (DE)

( * ) Notice: Subject to any disclaimer, the term of this patent is extended or adjusted under 35 U.S.C. 154(b) by 119 days.

(21) Appl. No.: 18/653,137

(22) Filed: May 2, 2024

(65) Prior Publication Data

US 2024/0367912 A1 Nov. 7, 2024

(30) Foreign Application Priority Data

May 3, 2023 (DE) ..................... 10 2023 111 361.5

(51) Int. Cl.

*B65G 15/16* (2006.01)
*B65G 15/60* (2006.01)
*G01G 11/00* (2006.01)

(52) U.S. Cl.

CPC ............ *B65G 15/16* (2013.01); *B65G 15/60* (2013.01); *G01G 11/003* (2013.01); *B65G 2207/00* (2013.01)

(58) Field of Classification Search

CPC .... B65G 15/16; B65G 15/60; B65G 2207/00; B65G 15/14; G01G 11/003; G01G 19/03
See application file for complete search history.

(56) References Cited

U.S. PATENT DOCUMENTS 3,581,876 A * 6/1971 Keith ..................... B65G 37/00 53/526
4,230,218 A * 10/1980 Kunzmann ........ B65H 31/3027 198/604
4,723,650 A * 2/1988 Hartmann .............. B65G 15/16 198/457.03
5,966,901 A * 10/1999 Komp .................. B65B 59/005 198/626.5
6,105,419 A * 8/2000 Michels ................ G01M 3/329 73/49.3
11,180,272 B2 * 11/2021 Gabrielli ................. B65B 11/50
2003/0019728 A1 * 1/2003 Kitagawa ............... B65G 47/28 198/604
2008/0128246 A1 * 6/2008 Anderson ............ B65B 63/026 198/604
2018/0037419 A1 * 2/2018 Günther ................. B65G 15/12
2018/0328518 A1 * 11/2018 Broussard, III .......... F16L 1/06
2022/0234771 A1 * 7/2022 Bruhn .................. B65B 59/005

FOREIGN PATENT DOCUMENTS

CN 106218978 A * 12/2016 ........... B65B 51/067
DE 19542651 C1 * 1/1997 ........... B07C 5/3404
DE 202017004165 U1 * 9/2017 ............. G01G 19/03
EP 2116821 A1 * 11/2009 ........... G01G 11/003
GB 977382 A * 12/1964 ............... B65C 9/02
GB 2259776 A * 3/1993 .............. G01M 3/36
WO WO-2019149322 A1 * 8/2019 ............ B65G 23/44

* cited by examiner

*Primary Examiner* — Gene O Crawford
*Assistant Examiner* — Abby A Jorgensen
(74) *Attorney, Agent, or Firm* — Nathan H. Calvert

(57) ABSTRACT

A space saving apparatus comprised of a conveyor device and a scale. The scale includes a weighing belt that is directly adjacent to the conveyor device. The conveyor device includes a release section that permits unclamped products to reach the weighing belt. The length of the weighing belt is no shorter than the length of the release section.

16 Claims, 2 Drawing Sheets

X
Z
α > 0°
W
BW
LBW
XKU
T, TG
LT
XT
P
ZB
BU
KU
KO
FBO
FBU
M
FO
BO
F
M'
A

ARRANGEMENT WITH CONVEYOR AND SCALE

TECHNICAL FIELD OF THE INVENTION

This invention concerns the joint arrangement of a conveyor and a scale.

BACKGROUND OF THE INVENTION

In the industrial manufacture of products, transporting such products over a production line and subjecting them to various processing steps is known. For example, products can be provided with certain markings, tested for adherence to certain preset values, closed, sealed, imprinted, scanned, irradiated, inspected, verified, or otherwise processed. After processing, the products can also be weighed, for example, to then conduct further processing steps on the basis of the weight. For example, such further processing steps can involve the adherence to a minimum weight or be a completeness control. Theoretically, one could also determine from the weight if a package insert has been enclosed in the product or if a seal has been applied to it.

Transporting products with a conveyor in which an upper conveyor belt and a lower conveyor belt lie vertically one above the other and the product is clamped between them while being processed and at the same time transported in transport direction X is known. Such a conveyor in which objects are conveyed while in contact with both an upper conveyor belt and a lower conveyor belt may be referred to herein as a clamping-type conveyor. A weighing belt of a scale downstream from the conveyor receives the processed products to transport them further and to weigh the products.

Feeding products from a clamping-type conveyor may be disadvantageous in that the products, at the moment at which they leave the clamp between the two belts lying one above the other in the transport direction, will tilt, jump, slip, or move in an uncontrolled or undesirable manner, especially at their rear end. A controlled transfer to the weighing belt without the scale being subjected to disruptive jarring is thus not possible. In practice one may try to remedy this by arranging a transfer belt between the conveyor and the weighing belt on which the products can be transferred un-clamped from the conveyor to the weighing belt and then "softly" transferred to the weighing belt. However, this has a disadvantageous effect of increasing the total length of the "conveyor+weighing belt" arrangement.

SUMMARY OF THE INVENTION

It is an object of this invention to overcome the disadvantages described above. The invention is based on the recognition that an especially short construction of the conveyor and weighing belt arrangement can be achieved by a combination of several construction characteristics of the arrangement. Embodiments in accordance with the invention may position the weighing belt immediately following the lower conveyor belt in the transport direction X, so that the weight of a product can be transferred directly to the weighing belt from the lower conveyor belt as it is transported. This minimizes the total length of scale and conveyor in transport direction X.

The conveyor in embodiments of the invention may also be outfitted with a release section, which provides that the product is already completely unclamped (released) before it is transferred from the conveyor to the weighing belt, in order to avoid jarring on the weighing belt.

In some implementations the upper and lower conveyor belts are each passed as an endless belt around a respective upper or lower belt body, where at least the upper belt body has a belt support element. While it travels around the upper belt body, a lower run of the upper conveyor belt slides closely at least on the underside of the belt support element facing an upper run of the lower belt body. That is, the underside of the belt support element for the upper conveyor belt is positioned adjacent to the lower run of the upper conveyor belt so as to provide support to that portion of the upper conveyor belt from above. The sections of the upper and lower conveyor belts facing each other, that is, the lower run of the upper conveyor belt and the upper run of the lower conveyor belt, have a belt spacing $Z_B$ in a vertical direction Z running orthogonal to the transport direction X. The belt support element comprises a straight clamping section facing the lower conveyor belt that extends in transport direction X and runs at a preset vertical spacing parallel to a straight clamping section of the lower belt body. This arrangement of conveyor belts allows a product clamped by and between the upper and lower conveyor belts, specifically between the lower run of the upper conveyor belt and the upper run of the lower conveyor belt, to be transported in transport direction X in a stable and defined way. The straight clamping section of the belt support element may be referred to herein as the "upper belt straight clamping section" or simply the "upper clamping section" and the straight clamping section of the lower belt body may be referred to herein as the "lower belt straight clamping section" or the "lower clamping section."

According to the invention, the belt support element additionally has a release section facing the upper run of the lower conveyor belt starting from a connecting position defined along transport direction X and with a release length downstream of the upper clamping section in the transport direction X. This release section extends at least partly above the lower clamping section so as to at least partially overlap the lower clamping section, where the belt spacing along the release length, according to the invention, increases enough that the clamping of the product becomes looser as it is transported in the transport direction. Preferably, the front end of the release section facing the weighing belt in transport direction X simultaneously forms the front end of the belt support element. In addition, a scale is provided with a drivable weighing belt made with a preload, which belt extends over a predetermined weighing belt length in transport direction X, in order to accept products delivered by the conveyor in a completely released form, and to weigh and transport the products further. It is additionally provided according to the invention that the length of the weighing belt is no shorter than the release length.

The interplay of the above-described characteristics of arrangements in accordance with the present invention results in the advantage that products that are being processed and clamped in the transport direction can be transferred in a space-saving arrangement to an immediately following weighing belt, since—unlike the prior art—the products at the point of transfer to the weighing belt have already been completely released. Matching the release length to the length of the weighing belt ensures in an inventive way that the products are reliably released and can be properly weighed by the scale. On the other hand, if the release length exceeds the length of the weighing belt, a product whose length approximately corresponds to the release length will not entirely lie on the weighing belt and therefore cannot be correctly weighed. "Length" as used herein refers to the length in the transport direction X, unless otherwise noted.

According to an advantageous embodiment, the length of the weighing belt is determined according to the maximum length of a product to be weighed. In establishing a meaningful belt length it can be taken into account that after the complete transfer of the product onto the weighing belt, a certain settling time $t_E$ passes before all settling processes have sufficiently abated in order to be able to determine a meaningful measurement value. Since the product is moving at a preset belt speed $V_B$ during this time, for a belt length selected according to the product length a settling length addition $L_E$ can be calculated according to the following formula:

$$L_E = (V_B \cdot t_E) + L_C$$

where $V_B$=presettable belt speed of the weighing belt $t_E$=presettable settling time $L_C$=empirically or otherwise determined or preset, variable or constant, correction value The axle spacing of two guide elements which reverse the direction of the weighing belt, can serve as weighing belt length according to some embodiments of the invention. These guide elements may comprise guide rollers in some implementations.

Theoretically, however, a product to be weighed could project forward and/or backward over the axles of the guide elements at least as far as the guide elements or rollers extend in transport direction X. In these embodiments, the weighing belt length would correspond to the length between the axles of the two guide elements plus the two radii of the relevant guide elements. When the two guide elements/rollers have equal diameters, the addition of the two radii is precisely one roller diameter. If a transfer element forming a preload (for example in the form of a metal strip or similar, as described below) upstream or downstream from the actual weighing belt is provided, its extent in the transport direction X can likewise amount to the weighing belt length.

It is provided according to some embodiments of the invention that the release section comprises a straight (linear) section, so that the belt spacing increases linearly along the release length. The increasing belt spacing along the release length provides a uniform, harmonic transition of the product from the clamped to the unclamped state while the product is moving in transport direction X. The release section can have a different profile as needed, along which the upper conveyor belt is tightly guided in the vertical direction, for example, in a curved or non-arc-shaped course.

According to other advantageous embodiments of the invention it is provided that the release section a) is made in one piece or is rigidly connected to the upper clamping section (the number of individual parts and the assembly cost are reduced by this and at the same time the stability of the belt support element or the upper belt body is improved).

and/or b) connects to the upper clamping section on its side facing the lower clamping section over a radius (such a radius is easy to prepare and is especially suitable for guiding the upper conveyor belt from the upper clamping section to the release section), and/or c) is movable relative to the upper clamping section, in particular can swivel (pivot) and is adjustable (through this the conveyor can be adjusted to different release requirements or product geometries).

In some implementations the belt support element may extend over the entire length of the upper belt body and thus defines the travel of the upper conveyor belt in the X-Z direction as it circulates. The belt support element then corresponds essentially or entirely to the upper belt body. The belt support element can be made and formed as a preferably one-piece contact surface for lower run of the upper conveyor belt in any case running parallel to the transverse direction Y, thus typically running horizontally, on which surface lower run of the conveyor belt slides along in contact as it circulates. A reversing or drive roller that performs the reversal of the conveyor belt in the relevant opposite direction instead of the belt support element can be provided at the forward and/or back end of the upper belt body in the transport direction X.

The lower clamping section extends to a frontmost end in transport direction X, where the distance between the connecting position and the frontmost end of the lower clamping section, measured in transport direction X, may be at least 20 mm, preferably at least 50 mm, most preferably more than 80 mm, in order to release the clamping of a correspondingly long product before the transported product reaches the frontmost end of the lower clamping section.

Also, the release length itself can, according to advantageous embodiments of the invention, have a preset length, which is preferably at least 20 mm, preferably at least 50 mm, maximally preferably more than 80 mm.

In some implementations the upper belt guide can be slidably positioned and secured relative to the lower belt guide in the vertical direction Z in order to be able to clamp and transport products of different heights.

According to other advantageous embodiments of the invention, at least one processing station is disposed on the conveyor and is designed to process a product completely clamped between the upper and lower clamping sections. In this case completely clamped means that the product is secured in the vertical direction and in a transverse direction Y, which runs orthogonally to the transport direction X and the vertical direction Z. Only in the transport direction X can the product be moved during the processing, for which the upper and lower conveyor belt can be precisely driven. Processing possibilities are, for example, labeling (imprinting, gluing, spraying, etc.) the product and/or recording and/or verifying a characteristic or a labeling of the product with electromagnetic and/or optical identification means. Preferably the processing occurs while the product moves in transport direction X. Preferably, the product remains completely clamped between the upper and the lower conveyor belts during its transport, in any case until all processing operations provided along the conveyor have been completed. This is relevant when a product that is only poorly or not at all clamped cannot be correctly processed. Thus, a product that is not moving in a defined way can be poorly imprinted and possibly may miss a printing stroke of a labeling system. Also, the printed image of an ink jet print applied to the product can become distorted and unreadable if the product can move not only in transport direction X, but also can move or is moved transversely. Also, reading labels (RFID coding, barcode, QR code, etc.) from the product can be impeded if the product can also move lateral to the transport direction X.

According to the invention the length of the weighing belt is related to the release length. Additionally, the release length can also be established in dependence on a preset length region, which covers the length of the shortest, or in any case the length of the longest product to be processed or transported and weighed. In this way the processing and conveyor device can be equipped or set for a group of products of different lengths. In these embodiments, the maximum product length determines the minimum length of the release section. In some implementations the effective length of the release section may be variable or adjustable in order to be able to react to different product lengths. For example, the release section can be slidably positionable and securable on the upper belt body entirely or in parts along a slot or otherwise positionable setting.

Of course, any of the belts (conveyor belt, weighing belt) can also be made or replaced by a plurality of individual belts, bands, or straps, as long as the relevant transport or weighing function is satisfied.

These and other aspects, advantages, and features of the invention will be apparent from the following description of representative embodiments, considered along with the accompanying drawings.

DESCRIPTION OF REPRESENTATIVE EMBODIMENTS

Figure 1:
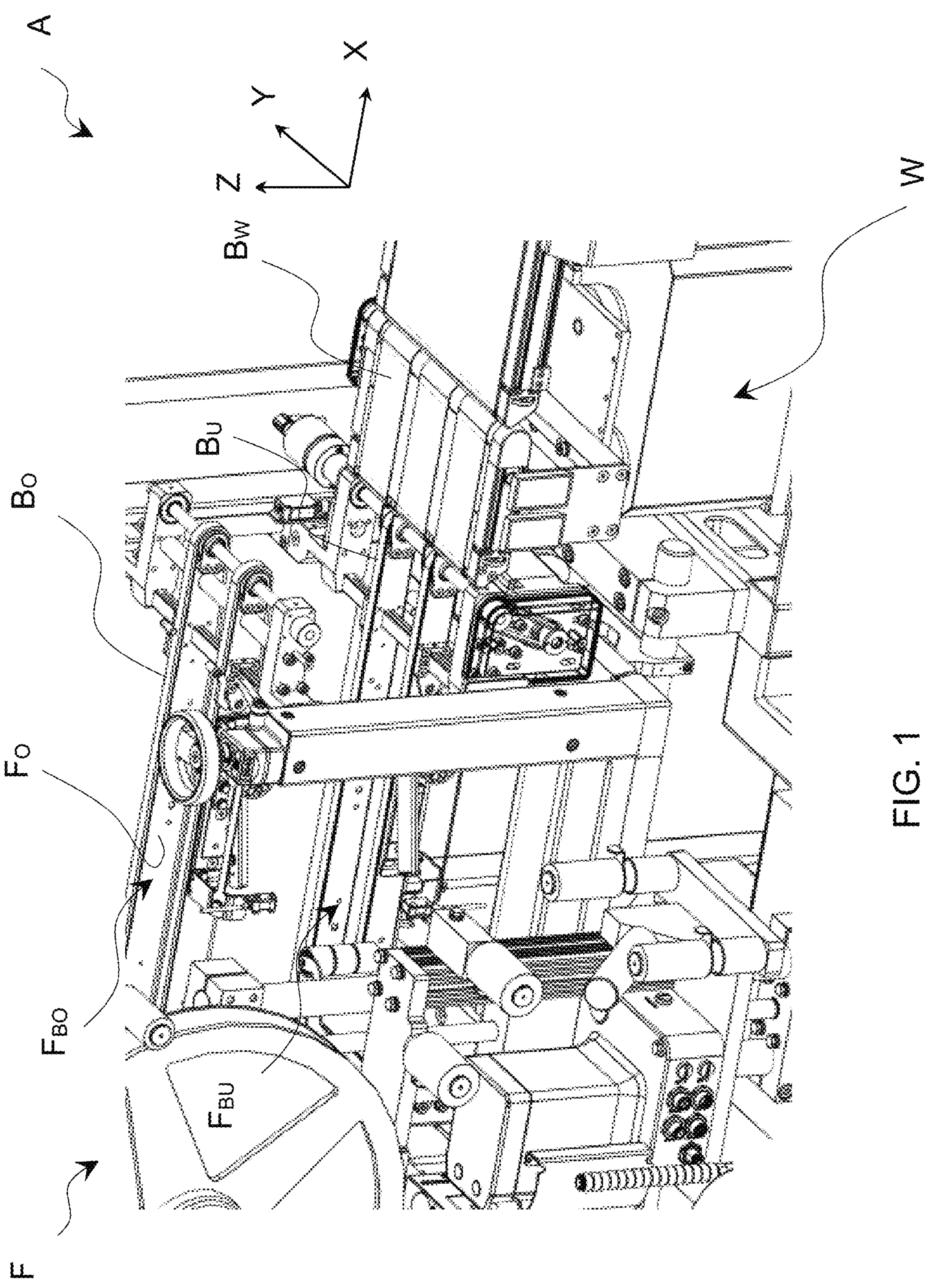
FIG. 1 shows a perspective view of an arrangement according to the invention.
Figure 2:
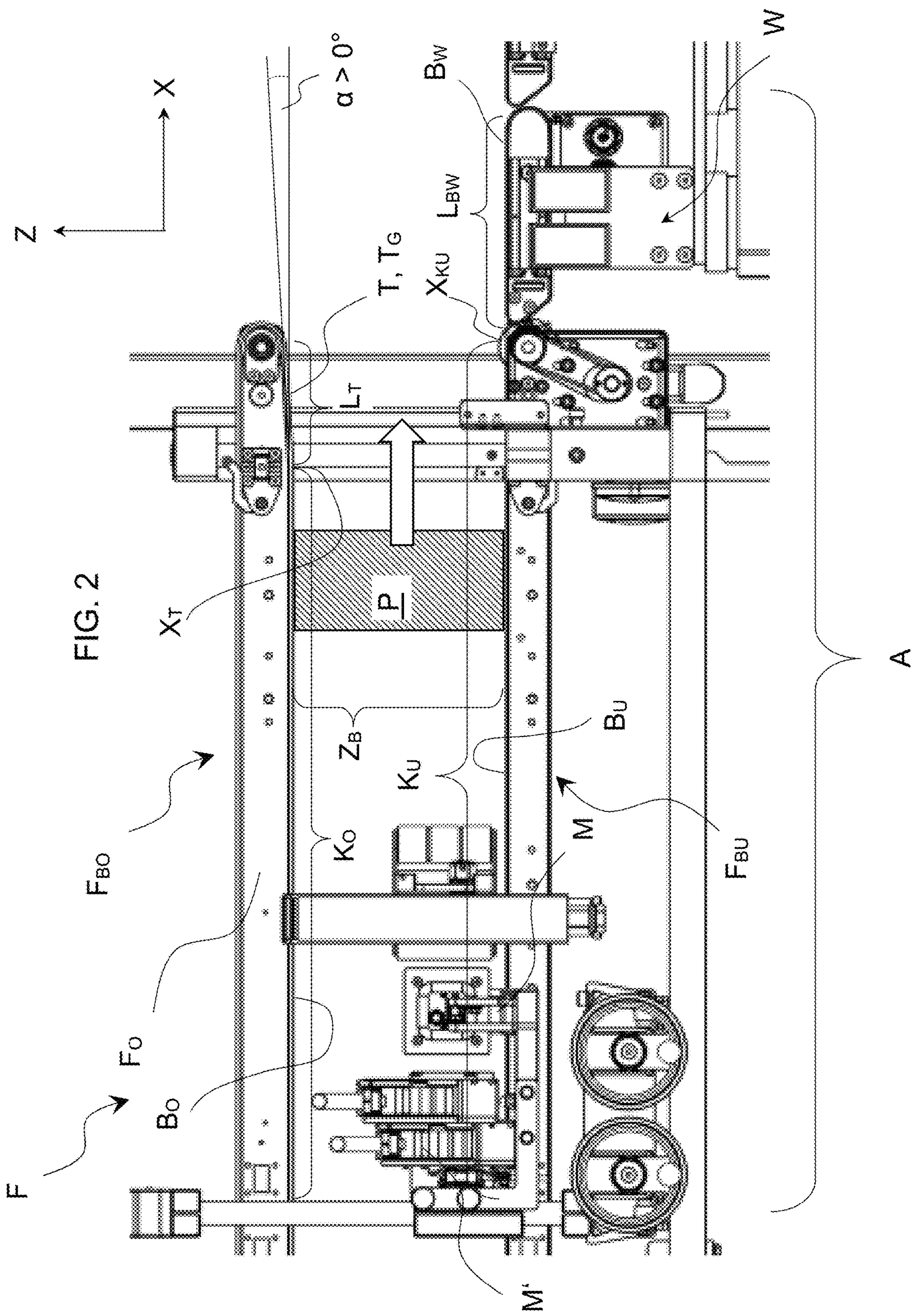
FIG. 2 shows a side view of an arrangement according to the invention.

FIGS. 1 and 2 show a portion of a production line with an arrangement A, which comprises a scale W and a conveyor F. The conveyor F is designed and configured to transport products P in a transport direction X. As shown in FIG. 2, the products P are moved along at processing stations M, M' in order to process the products P by means of the processing stations (imprinting, scanning, labeling, etc.).

Processing takes place while the products P are clamped, in order to avoid undesirable relative movements of the products during processing. For this purpose the conveyor device F comprises a lower conveyor belt $B_U$, which lies below an upper conveyor belt $B_O$ in a vertical direction Z. Each conveyor belt is carried by a respective upper or lower belt body $F_{BO}$, $F_{BU}$, where each belt body is outfitted with drive means (not shown) for the respective conveyor belt. As shown in FIG. 1 the example conveyor device F includes two laterally spaced belt bodies or conveyor belts shown. Such an arrangement enables stable transport of the products and for certain processing operations allows access to the upper side and lower side of the product between the horizontally spaced belt bodies at the same time. The two upper and lower belt bodies are comparable, so that in what follows the description can be limited to just one belt body.

The upper belt body $F_{BO}$ comprises a belt support element $F_O$, on which the upper conveyor belt $B_O$ slides along during its circulation around the upper belt body $F_{BO}$ and at the same time is closely supported. As shown in FIG. 2 the belt support element $F_O$ has a straight clamping section $K_O$, which is facing the upper run of the lower conveyor belt $B_U$. The upper clamping section $K_O$ extends in a presettable vertical spacing parallel to a straight lower clamping section $K_U$ of the lower belt body $F_{BU}$. In the practice of this invention, a product P can be clamped by and between the upper and lower clamping sections and thus between the two conveyor belts $B_O$, $B_U$, that is, between the lower run of the upper conveyor belt $B_O$ and the upper run of the lower conveyor belt $B_U$, supported by the respective clamping section in each case, while the product is being transported by the driven conveyor belts in the transport direction X.

As can be seen in FIG. 2, a release section T connects in transport direction X to the upper clamping section $K_O$. The release section T connects to the upper clamping section $K_O$ starting from a connecting position $X_T$, essentially likewise in transport direction X. The release section T has a length $L_T$, which is referred to herein as the release length. A reversing roller, which is not shown in more detail, is provided at the frontmost end of the upper belt body and reverses or returns the upper conveyor belt $B_O$, which is guided along the release section T, to the upper side of the belt body. The release section T of the belt support element $F_O$ extends up to the reversing roller. Comparably, such a reversing roller is provided at the frontmost end, looking in the X direction, of the lower belt body $B_U$. The lower clamping section $K_U$ extends up to this lower reversing roller of lower belt body $B_U$.

The release section T in the illustrated embodiment is essentially made as a straight section $T_G$, which extends slightly upward at a low angle $\alpha$. A product P transported in direction X and initially clamped between the conveyor belts is gradually released along the release length $L_T$ until the back end of the product P reaches the gently rising release section T. Since the belt spacing $Z_B$ between the upper and lower conveyor belts becomes greater along the release section T by the clamping release distance in the Z direction, the clamping effect correspondingly decreases, so that the product P is completely released when its front edge reaches the frontmost effective end $X_{KU}$ of the lower clamping section $K_U$.

In transport direction X the weighing belt $B_W$ connects to a scale W disposed upstream from the conveyor device F, directly adjacent to (immediately at) the lower conveyor belt $B_U$. That is, the receiving end of weighing belt $B_W$ which receives products from the lower conveyor belt $B_U$ is directly adjacent to the frontmost end of the lower clamping section $K_U$. The arrangement of the weighing belt $B_W$ is chosen so that a product P being transported by the lower conveyor belt $B_U$ transfers its weight from the lower conveyor belt $B_U$ directly to the weighing belt $B_W$. In particular, the arrangement of an intermediate additional conveyor belt or another support surface that is known from the prior art is omitted. The scale W with its weighing belt $B_W$ can therefore be introduced with the receiving end of weighing belt $B_W$ very close to the conveyor device F in order to spare overall construction length in the transport direction X.

The weighing belt $B_W$ has a weighing belt length $L_{BW}$, which in the illustrated example corresponds to the total length of the weighing belt in the transport direction X. In addition, the weighing belt length $L_{BW}$ is chosen so that it corresponds at least to the release length $L_T$. Through this it is ensured that the scale W can properly weigh any product, which is transferred to it from the upstream conveyor device F in a completely released state.

The arrangement of the weighing belt "immediately" behind the lower conveyor belt (that is, directly adjacent in the transport direct X) according to the invention is to be understood to mean that no construction elements that project into the transport plane and unnecessarily increase the spacing between the lower conveyor belt $B_U$ and the weighing belt $B_W$ are disposed between the weighing belt and the lower conveyor belt. However, according to some embodiments of the invention the arrangement of a short transition element is conceivable, in particular a short metal support, which serves to cover the unavoidable, for example gusset-shaped, transition gap or roller gap between a front reversing roller of the lower conveyor belt $B_U$ and the rear reversing roller of the directly connected weighing belt $B_W$. The transition element can lie at the height of the conveyor plane, which is defined by the top side of the lower conveyor belt $B_U$ or the adjacent weighing belt $B_W$. In this case the transition element supports the product P as it passes over the gap.

The transition element can be affixed at the weighing belt $B_W$ and so forms a preload. This embodiment enables a weighing signal to be received when the product has already passed the transition element but has not yet reached the actual weighing belt. Alternatively, the transition element can also be a part of the conveyor device F. In this case the transition element does not form a preload. This is also true for a third embodiment, in which the transition element is carried by a machine frame, which is not associated either with the scale W or the conveyor device F. A comparable transition element can also be provided on the downstream side of the weighing belt $B_W$.

As used herein, whether in the above description or the following claims, the terms "comprising," "including," "carrying," "having," "containing," "involving," and the like are to be understood to be open-ended, that is, to mean including but not limited to. Also, it should be understood that the terms "about," "substantially," and like terms used herein when referring to a dimension or characteristic of a component indicate that the described dimension/characteristic is not a strict boundary or parameter and does not exclude variations therefrom that are functionally similar. At a minimum, such references that include a numerical parameter would include variations that, using mathematical and industrial principles accepted in the art (e.g., rounding, measurement or other systematic errors, manufacturing tolerances, etc.), would not vary the least significant digit.

The directions referenced herein and in the following claims, namely, the X or transport direction, the Z or vertical direction, and the Y or transverse direction refer to the corresponding directions indicated in the drawings.

Any use of ordinal terms such as "first," "second," "third," etc., in the following claims to modify a claim element does not by itself connote any priority, precedence, or order of one claim element over another, or the temporal order in which acts of a method are performed. Rather, unless specifically stated otherwise, such ordinal terms are used merely as labels to distinguish one claim element having a certain name from another element having a same name (but for use of the ordinal term). Rather than using an ordinal term to distinguish between commonly named elements, a particular one of a number of elements may be called out in the following claims as a "respective one" of the elements and thereafter referred to as "that respective one" of the elements.

The term "each" may be used in the following claims for convenience in describing characteristics or features of multiple elements, and any such use of the term "each" is in the inclusive sense unless specifically stated otherwise. For example, if a claim defines two or more elements as "each" having a characteristic or feature, the use of the term "each" is not intended to exclude from the claim scope a situation having a third one of the elements which does not have the defined characteristic or feature.

The above-described preferred embodiments are intended to illustrate the principles of the invention, but not to limit the scope of the invention. Various other embodiments and modifications to these preferred embodiments may be made by those skilled in the art without departing from the scope of the present invention. For example, in some instances, one or more features disclosed in connection with one embodiment can be used alone or in combination with one or more features of one or more other embodiments. More generally, the various features described herein may be used in any working combination.

KEY

A arrangement
$B_O$ upper conveyor belt
$B_U$ lower conveyor belt
$B_W$ weighing belt
F conveyor device
$F_{BO}$ upper belt body
$F_{BU}$ lower belt body
$F_O$ belt support element
$K_O$ upper clamping section
$K_U$ lower clamping section
$L_{BW}$ length of weighing belt in X direction
$L_T$ release length, length of release section in X direction
$L_C$ correction value
$L_E$ settling length addition
M, M' processing station
P product to be conveyed
$t_E$ settling time
T release section
$T_G$ straight section of release section (T)
$V_B$ belt speed
W scale
X transport direction
$X_{KU}$ frontmost end of lower clamping section (Kr)
$X_T$ connecting position
Z vertical direction
$Z_B$ belt spacing

The invention claimed is:

1. An apparatus comprising:

(a) a conveyor device adapted to transport products in a transport direction;

(b) wherein the conveyor device includes an upper conveyor belt and a lower conveyor belt arranged in parallel with each other, the lower conveyor belt being located under the upper conveyor belt and spaced apart from the upper conveyor belt in a vertical direction running orthogonal to the transport direction;

(c) wherein the upper conveyor belt extends around an upper belt body and the lower conveyor belt extends around a lower belt body such that a lower run of the upper conveyor belt faces an upper run of the lower conveyor belt with a belt spacing therebetween in the vertical direction, and wherein the upper belt body includes a belt support element extending adjacent to the lower run of the upper conveyor belt;

(d) wherein the belt support element includes an upper belt straight clamping section facing the upper run of the lower conveyor belt and extending in the transport direction parallel to a lower belt straight clamping section of the lower belt body at a presettable vertical spacing in order to facilitate the transport of the products in the transport direction between the lower run of the upper conveyor belt and the upper run of the lower conveyor belt;

(e) wherein the belt support element includes a release section facing the upper run of the lower conveyor belt and extending from a connecting position adjacent to the upper belt straight clamping section along a release length in the transport direction, the release section at least partially overlapping the lower belt straight clamping section and residing at an angle with respect to the upper belt straight clamping section so that the distance between the lower run of the upper conveyor belt and the upper run of the lower conveyor belt increases in the transport direction; and (f) a scale including a weighing belt forming a preload, the weighing belt extending over a weighing belt length in the transport direction in order to accept products delivered by the conveyor device, wherein a receiving end of the weighing belt is located adjacent to a frontmost end of the lower belt clamping section in the transport direction and the weighing belt length is the same length or longer than the release length.

2. The apparatus of claim 1 wherein the release section extends linearly so that the distance between the lower run of the upper conveyor belt and the upper run of the lower conveyor belt increases linearly along the release length.

3. The apparatus of claim 1 wherein the release section is made in one piece with or is rigidly connected to the upper belt straight clamping section.

4. The apparatus of claim 3 wherein the release section connects to the upper belt straight clamping section over a radius.

5. The apparatus of claim 1 including a pivot connection between the release section and the upper belt straight clamping section for adjusting the angle between the release section and the upper belt straight clamping section.

6. The apparatus of claim 1 wherein the distance in the transport direction between the frontmost end of the lower belt straight clamping section and the connecting position is at least 20 mm.

7. The apparatus of claim 1 wherein the distance in the transport direction between the frontmost end of the lower belt straight clamping section and the connecting position is at least 50 mm.

8. The apparatus of claim 1 wherein the distance in the transport direction between the frontmost end of the lower belt straight clamping section and the connecting position is more than 80 mm.

9. The apparatus of claim 1 wherein the release length is at least 20 mm.

10. The apparatus of claim 1 wherein the release length is at least 50 mm.

11. The apparatus of claim 1 wherein the release length is more than 80 mm.

12. The apparatus of claim 1 wherein the upper belt body is slidably positionable and securable relative to the lower belt body in the vertical direction.

13. The apparatus of claim 1 further comprising at least one processing station for performing a process on a product clamped between the upper belt straight clamping section and the lower belt straight clamping section.

14. The apparatus of claim 1 wherein the lower conveyor belt is adjustable to operate at a lower conveyor belt speed that corresponds to a transport speed of the weighing belt.

15. The apparatus of claim 1 wherein the weighing belt length is determined based on a maximum length in the transport direction of a product to be weighed plus a settling length addition ($L_E$), which follows from the condition $$L_E = (V_B \cdot t_E) + L_C$$

where $V_B$=presettable belt speed of the weighing belt $t_E$=presettable settling time $L_C$=presettable correction value, the weighing belt length comprising an axle spacing of two reversing elements for the weighing belt or the axle spacing plus the radii of the two reversing elements.

16. The apparatus of claim 1 wherein the release length is at least as large as a preset maximum product length in the transport direction.

* * * * *